Sept. 30, 1947.  J. N. WOLFRAM  2,428,189
COUPLING FOR HOSE
Filed Jan. 8, 1945  2 Sheets—Sheet 1
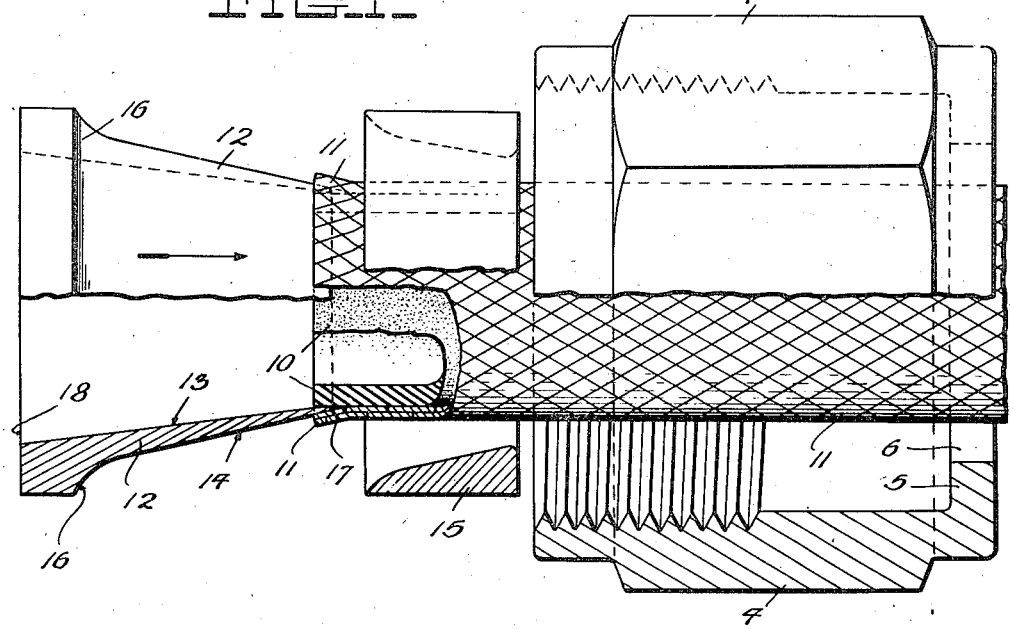
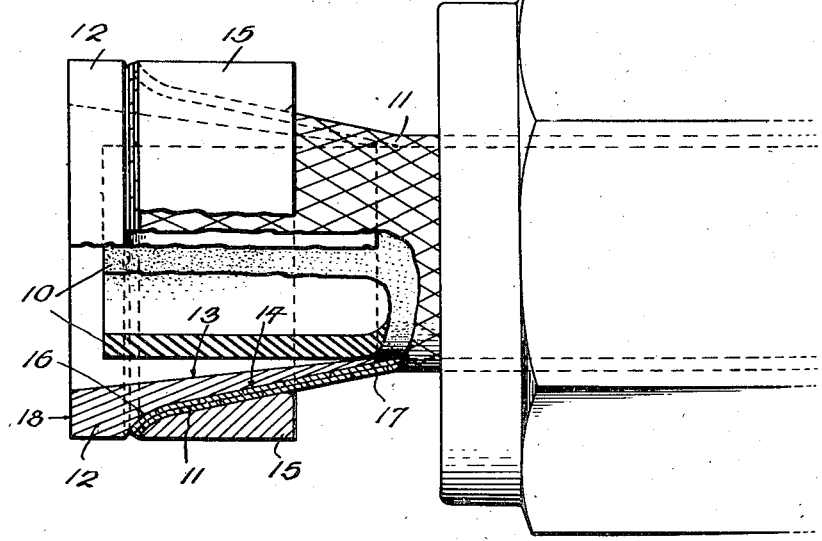
INVENTOR.
John N. Wolfram
BY
Mason, Porter & Diller
Atty Sept. 30, 1947. J. N. WOLFRAM 2,428,189
COUPLING FOR HOSE
Filed Jan. 8, 1945 2 Sheets-Sheet 2
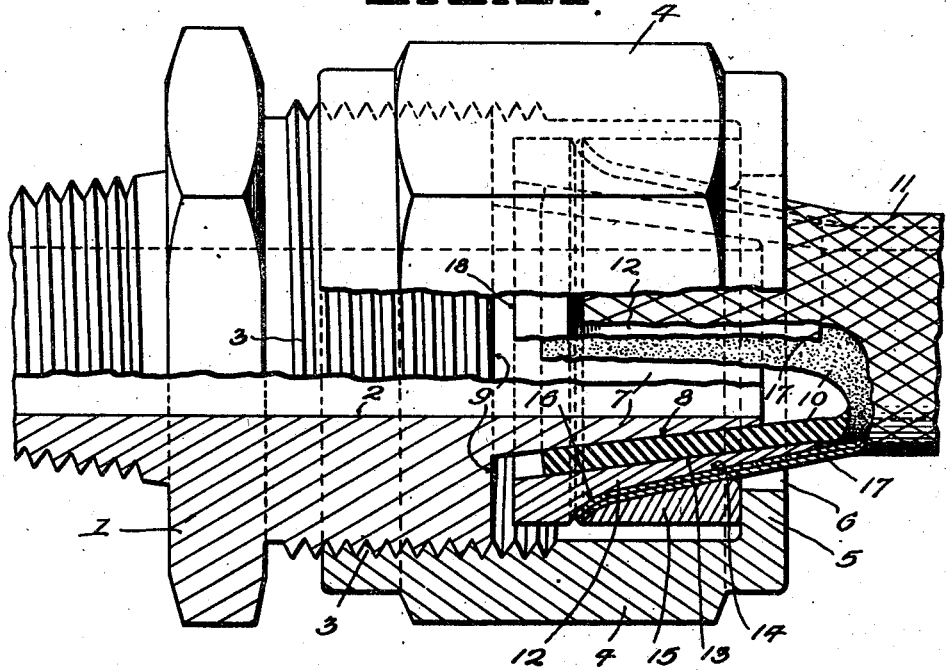
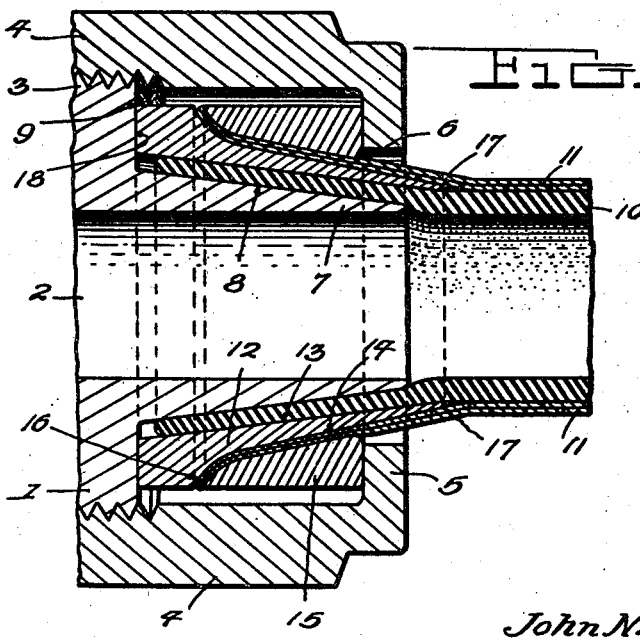
INVENTOR.
John N. Wolfram.
BY
Mason, Porter & Diller
Attys.

Patented Sept. 30, 1947

2,428,189

UNITED STATES PATENT OFFICE 2,428,189

COUPLING FOR HOSE

John N. Wolfram, Cleveland, Ohio, assignor to The Parker Appliance Company, Cleveland, Ohio, a corporation of Ohio Application January 8, 1945, Serial No. 571,818

3 Claims. (Cl. 285—72)

1

The invention relates to new and useful improvements in a coupling for a hose and more particularly a hose which has a rubber inner section and an outer protective cover.

An object of the invention is to provide a coupling wherein the hose is secured to a body member by devices which separately grip the rubber section and the protective cover.

A further object of the invention is to provide a coupling of the above type with means for limiting the clamping pressure against the rubber section without disturbing the grip of the coupling upon the protective cover.

In the drawings—

Figure 1 is a view partly in side elevation and partly in section showing a coupling embodying the improvements with the nut and ring placed on the hose and the clamping sleeve with its initial insertion between the protective cover and the rubber section;

Figure 2 is a view similar to Figure 1 but showing the sleeve fully inserted between the rubber section and the protective cover and the ring as finger-forced onto the protective cover and holding the same against the sleeve;

Figure 3 is a view showing the hose as forced onto the nipple of the body member by a finger tightening of the nut;

Figure 4 is a sectional view showing the coupling completely closed and gripping separately the rubber section and the protective cover with a limited clamping pressure on the rubber section.

The coupling includes a body member 1 which may be attached to any suitable part. Said body member has a bore 2 therethrough which is substantially the same as the inner diameter of the hose which is to be joined to the body member. Said body member has a threaded section 3 with which a nut 4 makes connection. The nut 4 has a flange 5 at its outer end surrounding an opening 6 through which the hose extends into the coupling.

The body member is shaped so as to provide a nipple 7 which is of the same bore as the body member. The outer face of the nipple 7 is tapered as indicated at 8 to form a tapered seat against which the rubber section of the hose may be clamped. The body member at the inner end of the nipple 7 is provided with a shoulder 9 lying in a plane substantially at right angles to the axis of the coupling. The hose includes a rubber section 10 and a protective cover section 11. This protective cover section 11 may be of any suitable material, but preferably it is formed of glass braid fibers impregnated with a flexible

2 plastic. It may, however, be made of cotton braid or metal braid.

Associated with the nipple and operating to clamp the rubber section against the seat thereon is a sleeve 12. The inner face 13 of this sleeve is tapered to conform substantially to the face of the seat 8. The outer face 14 of the sleeve is tapered on a steeper angle and this outer face serves as a seat against which the protective cover of the hose is clamped.

Located within the nut is a clamping ring 15 which is engaged by the flange 5 of the nut. The inner face of this clamping ring is tapered to conform substantially to the taper of the face 14 of the sleeve 12, and cooperates therewith in the clamping of the protective cover. The outer tapered face of the sleeve, at its inner end, is more abruptly tapered as indicated at 16 and the inner end of the ring 15 is likewise more abruptly tapered to conform to the taper 16 of the sleeve.

The inner face 13 of the sleeve 12 and the outer face 14 thereof intersect at 17 in what might be referred to as a knife edge. This edge is circular and is of a diameter substantially conforming to the outer diameter of the rubber section of the tube.

When it is desired to attach a hose to the coupling the nut and the ring are slipped onto the hose. Then the knife edge 17 of the sleeve 12 is inserted between the protective cover and the rubber section as indicated in Figure 1. The sleeve is forced in between the protective cover and the rubber section until the rubber section is close to the inner end of the sleeve. The ring 15 is then forced onto the sleeve and will grip the protective cover, as shown in Figure 2. The hose with the parts thus assembled thereon is then forced onto the nipple, the nipple extending into the rubber section of the hose. The nut is connected to the body member and is turned by hand substantially to the position shown in Figure 3. When the parts are positioned as shown in this figure, it will be noted that the sleeve clamps the rubber section against the nipple and the ring clamps the protective cover against the sleeve. That is to say, there are independent clamping devices for the rubber section and for the protective cover.

When the nut is turned further onto the body member the sleeve moving endwise along the nipple will compress the rubber section until the end 18 of the sleeve makes contact with the shoulder 9. The sleeve cannot be moved further relative to the nipple and therefore the clamping pressure against the rubber section is limited by this shoulder. In view of this limiting of the clamping pressure against the rubber section, all danger is eliminated of damaging the rubber section and reducing the effective grip of the coupling on the hose.

When the sleeve contacts with the shoulder 9, further pressure of the nut against the ring 15 will produce a clamping pressure against the protective cover which is entirely independent of the clamping pressure of the sleeve against the rubber section. The reason for tapering or curving the inner portion of the seat on the sleeve engaged by the protective cover is to limit the extent of clamping pressure of the ring against the protective cover. This limiting of the clamping pressure of the ring against the protective cover will also cause the end of the cover to be very firmly gripped between the ring and the sleeve.

From the above it will be noted that a coupling has been provided wherein the rubber section and the protective cover are separately gripped by the coupling and the clamping pressure of the coupling against the rubber section is limited without in any way disturbing the clamping pressure which may be exerted against the cover. Furthermore, there is a limit imposed upon the clamping pressure exerted on the protective cover. This makes a very efficient coupling of simple construction, readily assembled, wherein the hose is firmly connected to the coupling without the liability of injuring the rubber section of the hose.

By this arrangement the real grip of the coupling on the hose may be limited so as to establish a seal with a slight grip on the rubber section without any danger of damaging the same. The firm grip of the coupling on the hose is through the grip of the rigid metal surfaces contacting with the protective cover. It will be noted that in the tightening of the coupling if the end of the protective cover is pinched through there is still a substantial thickness of cover left unpinched which will firmly hold the hose in the coupling. The coupling is especially adapted for high pressure and so as to resist severe pull-out strains thereon.

It is obvious that minor changes in the details of construction and arrangement of the parts may be made without departing from the spirit of the invention as set forth in the appended claims.

I claim:

1. A coupling for a hose having an inner rubber section and an outer protective cover comprising a body member having the inner end thereof shaped to provide a relatively long tapered nipple adapted to extend into the rubber section and form a seat against which it may be clamped, a nut having a threaded engagement with said body member and having a clamping flange, a sleeve in said nut having its inner face shaped to conform substantially to the seat on the nipple and cooperating therewith to grip the rubber section, the outer face of said sleeve being tapered and adapted to form a clamping seat for the protective cover and a ring surrounding said sleeve and having its inner face shaped so as to conform substantially to the seat for the protective cover and cooperating therewith to grip said cover, said nut operating when turned onto said body member to force said ring into gripping engagement with the protective cover and to force said sleeve into gripping engagement with the rubber section.

2. A coupling for a hose having an inner rubber section and an outer protective cover comprising a body member having the inner end thereof shaped to provide a relatively long tapered nipple adapted to extend into the rubber section and form a seat against which it may be clamped, a nut having a threaded engagement with said body member and having a clamping flange, a sleeve in said nut having its inner face shaped to conform substantially to the seat on the nipple and cooperating therewith to grip the rubber section, the outer face of said sleeve being tapered and adapted to form a clamping seat for the protective cover, a ring surrounding said sleeve and having its inner face shaped so as to conform substantially to the seat for the protective cover and cooperating therewith to grip said cover, said nut operating when turned onto said body member to force said ring into gripping engagement with the protective cover and to force said sleeve into gripping engagement with the rubber section, and means for limiting the clamping pressure of the sleeve against the rubber section.

3. A coupling for a hose having an inner rubber section and an outer protective cover comprising a body member having the inner end thereof shaped to provide a relatively long tapered nipple adapted to extend into the rubber section and form a seat against which it may be clamped, a nut having a threaded engagement with said body member and having a clamping flange, a sleeve in said nut having its inner face shaped to conform substantially to the seat on the nipple and cooperating therewith to grip the rubber section, the outer face of said sleeve being tapered and adapted to form a clamping seat for the protective cover, a ring surrounding said sleeve and having its inner face shaped so as to conform substantially to the seat for the protective cover and cooperating therewith to grip said cover, said nut operating when turned onto said body member to force said ring into gripping engagement with the protective cover and to force said sleeve into gripping engagement with the rubber section, and a shoulder for limiting the endwise movement of the sleeve, said shoulder cooperating with said nut in the effective clamping of the protective cover between the ring and sleeve.

JOHN N. WOLFRAM.

REFERENCES CITED

The following references are of record in the file of this patent:

UNITED STATES PATENTS

| Number | Name | Date |
|---|---|---|
| 1,051,046 | Wittenmann | Jan. 21, 1913 |
| 1,326,250 | Brown et al. | Dec. 30, 1919 |
| Re. 21,603 | Guarnaschelli | Oct. 22, 1940 |